United States Patent [19]

Molinari

[11] Patent Number: 4,693,900
[45] Date of Patent: Sep. 15, 1987

[54] SHAPED PASTA PRODUCTS
[75] Inventor: Claudio Molinari, Collecchio, Italy
[73] Assignee: UNIMAC S.r.l., Collecchio, Italy
[21] Appl. No.: 765,865
[22] Filed: Aug. 14, 1985
[30] Foreign Application Priority Data
Sep. 28, 1984 [IT] Italy .............................. 46866 A/84
[51] Int. Cl.⁴ .......................... A23L 1/16; A23L 3/10
[52] U.S. Cl. .................................... 426/128; 426/557; 426/512
[58] Field of Search ................ 426/128, 451, 557, 512
[56] References Cited
U.S. PATENT DOCUMENTS
4,493,850 1/1985 Fioravanti ........................... 426/451

FOREIGN PATENT DOCUMENTS
2533806 4/1984 France ................................ 426/128
54-140752 11/1979 Japan ................................. 426/451

*Primary Examiner*—George Yeung
*Attorney, Agent, or Firm*—Bucknam and Archer

[57] ABSTRACT

Long life pasta shapes suitable for constituting the first course, consisting of portions of pre-cooked, de-aerated, pressed, sterilized and processed alimentary paste. The alimentary paste may be dry, fresh or egg pasta or rice and may be cooked with sauce or flavored according to the typical recipes of the Italian regions. The shapes are ready to eat as a quick meal after being heated in the oven, grilled or fried.

6 Claims, No Drawings

SHAPED PASTA PRODUCTS

BACKGROUND OF THE INVENTION

1. Field of the invention

This invention refers to long life pasta shapes suitable to be preserved for along period of time and which are ready to serve after heating, as a quick meal. In particular, this invention refers to shapes made from fresh or dry alimentary pasta, alimentary egg paste or rice, the pasta or rice are cooked with or without sauce, pre-shaped into single or multiple portions and stored in sealed or non-sealed packs.

2. Description of the prior art

In almost all the countries marked by rapid expansion, both from the point of view of dynamic economic growth, and from the point of view of expansion of tourism and intercultural relations in general, the rhythm of daily life is becoming increasingly more hectic.

In particular, due to very tight traveling schedules required by work, trips organized by tourist agencies and frequent journeys made by the younger populations eager to travel and to see the world keeping expenses as low as possible, the need has arisen for quick, light meals at low prices in a restaurant. In these restaurants, which are now given the name of sandwich bars, "fast food", or even pubs, these meals which are usually eaten at the counter, consist mainly of rolls variously filled with dressed pork products, sandwiches and toasted sandwiches, hot dogs, hamburgers, small pizzas or slices of pizza, savoury pastries, and so on.

Even though these meals give a sufficient number of calories for satisfactory nutrition, they nevertheless have a substantial drawback: with respect to current dietetic studies, they represent diets in which the basic ingredients consist of meat, vegetables, eggs and, in any case, foodstuffs which normally form part of the components of second courses in the known Mediterranean diet.

The basic dish of the Mediterranean diet, which consists of a first course based on pasta is, in fact, missing from the aforesaid diets.

SUMMARY OF THE INVENTION

This invention makes it possible to overcome this drawback, in that it provides a first course based on pasta, according to the characteristics of the Mediterranean diet, which has the same nutritional value as the traditional first courses of pasta and can be prepared, served and eaten very quickly and cheaply in the same fast food restaurants mentioned above.

The advantages achieved by means of this invention consist in ensuring an ever-increasing number of customers of a better, more complete, healthier and more well-balanced diet in greater comfort, in the short period of of time that they dedicate to indispensable physiological necessities of eating, and at a limited cost.

According to this invention, the first course consists of shapes of pre-cooked alimentary pasta, with or without sauce, which is de-aerated, pressed, sterilized and subjected to long-life processing.

This invention is described in greater detail hereunder, with reference to a number of particular methods of preparation and some of its packs or forms of preparation or presentation.

To prepare the shapes, first the pasta is cooked and single-portion packs of a pre-established weight are prepared.

The packs are then pressed, sealed, or not sealed, pasteurized and/or thermally sterilized and subjected to long-life treatment by means of deep-freezing and/or refrigeration. Any type of alimentary pasta may be used, such as dry and/or fresh pasta, such as spaghetti, rigatoni, macaroni, noodles, squares and so on, or egg-pasta such as noodles and the like, or also rice.

The alimentary pasta is pre-cooked, preferably in a double-bottomed cooker or steamed, or in special moulds, and mixed in a low-speed blender.

The pre-cooking or boiling should preferably be carried out in a sufficient quantity of water as to be completely absorbed by the pasta, in order to obtain a pre-cooked end product which retains its balanced content of starches intact.

The sauces which are subsequently mixed with the pre-cooked pasta are also subjected to a similar pre-cooking preparation.

The pre-cooked pasta is then mixed with the sauce and placed in molds, preferably of a cylindrical or parallelepipedal shape, subjected to a de-aerating treatment under vacuum for the necessary length of time to obtain its complete de-aeration, and then pressed by means of the action of adjustable-pressure lids fitted on to the said molds; after which the pasta is cooled.

The de-aerating treatment under vacuum serves the purpose of removing all the air trapped between the interspaces of the cooked pasta, in order to obtain layers of product as even as possible and to prevent any changes in the flavour of the products, after a some time, due to undesirable oxidation. Excellent results are already obtained with a treatment of approximately five minutes. When the pre-cooked, flavoured, de-aerated and pressed pasta has cooled down, it is cut into single portions of equal weight, in the form of circular, square or rectangular shapes, or of other shape.

The single portions are then packed, either singly or together with others, in containers for alimentary use, such as bags, trays, cartons and the like for distribution, or can be stored hermetically sealed in vacuum packs.

In addition to the treatment of deep-freezing or pasteurization and refrigeration for long storage life of the packs, the shapes may be submitted to thermal sterilization.

Upon completion of the pre-cooking phase, the subsequent phases described above can be carried out automatically by means of molding machines which carry out the operations of slicing, shaping and pressing in a continuous cycle, under vacuum.

Likewise, the treatment of thermal sterilization and of deep-freezing, or pasteurization with refrigeration, can be carried out in a substantially automatic continuous processing cycle.

The shapes of pasta, thus produced, are ready for use, after reheating in the oven or by grilling.

The pasta packed in shapes can be topped with any known type of sauce, such as for example tomato sauce, meat sauce, herb pesto, cheese and so on, according to all the recipes and variations included in the Italian traditional regional specialties. In addition, it can be flavoured and/or coloured with spices or concentrated natural flavouring in powder or liquid form. The use of such products facilitates the preparation of shapes which do not require subsequent and more elaborate sauces, as they are flavoured and coloured by means of natural flavourings and spices obtained from concentrates or purées of spinach, carrots, beetroot, onions and the like.

Alternatively, the pasta shapes, obtained as described above, can also be prepared without any flavouring or sauce, leaving the choice to the consumer when the product is eaten.

Another method of preparation comprises the pasta shapes without sauce packed together with packets of sufficient portions of any type of sauce, to be spread on the pasta before it is eaten.

A futher method of preparing the pasta shapes is that of covering them with breadcrumbs or batter, after they have been boiled or pre-cooked and after the sauce, if any, has been added.

These pasta shapes are also subsequently pressed, divided into portions, packed and subjected to thermal sterilization and long-life treatments identical to those described previously.

Before eating, they should preferably be reheated by frying, or in the oven or under the grill.

The pasta shapes produced, packed and stored as hereinbefore described, constitute a nourishing, wholesome, complete and well-balanced first course, as prescribed by the Mediterranean diet.

They can be quickly and easily eaten on any public premises or, thanks to their preparation and packing, can also be retailed by grocery supermarkets, shops or factories, or even by means of automatic or non-automatic dispensers, refrigerators or freezers.

What I claim is:

1. A shaped pasta product produced by cooking said pasta with water to obtain cooked pasta, placing said cooked pasta in a mold, deaerating under vacuum said cooked pasta in said mold to obtain deaerated cooked pasta, compressing said deaerated cooked pasta under vacuum to obtain compressed cooked pasta, cooling said compressed pasta to obtain a product consisting essentially of cooled compressed cooked pasta, cutting said product into portions, packaging said portions to obtain packaged portions, sterilizing said packaged portions, storing said sterilized packaged portions under vacuum condition to prevent oxidation.

2. The pasta product according to claim 1, which is frozen or refrigerated.

3. The pasta product according to claim 1, wherein said pasta after cooking in water is mixed with a sauce or flavoring agents.

4. The pasta product according to claim 1 wherein said pasta is cooked with the quantity of water which is absorbed by said pasta during cooking.

5. The pasta product according to claim 1 wherein said pasta is egg-noodles or spaghetti.

6. The pasta product according to claim 1, wherein said product after cooking is covered with breadcrumbs or batter.

* * * * *